Sept. 23, 1952  J. MORKOSKI  2,611,308
LIFT MECHANISM FOR TRACTOR IMPLEMENTS
Filed Oct. 28, 1948  3 Sheets-Sheet 3

Inventor,
James Morkoski
Paul O. Pippel
Att'y

Patented Sept. 23, 1952

2,611,308

UNITED STATES PATENT OFFICE 2,611,308

LIFT MECHANISM FOR TRACTOR IMPLEMENTS

James Morkoski, Canton, Ill., assignor to International Harvester Company, a corporation of New Jersey Application October 28, 1948, Serial No. 56,991

2 Claims. (Cl. 97—50)

This invention relates to agricultural implements and particularly to lifting mechanism therefor. More specifically, the invention concerns lift mechanism deriving power from a tractor engine for raising and lowering an implement with respect to the tractor.

The invention is particularly concerned with the use of dual hydraulic rams or the like, independently operable and powered from a tractor power plant, for performing different functions or for use together in raising and lowering a tractor-mounted implement. In the mounting of heavy implements upon certain tractors it has been found that the use of a single cylinder alone for lifting the implement and for lowering it to working position has placed too great a burden upon that cylinder. It has therefore been proposed for the lifting of heavy implements that both members of a dual cylinder ram unit be utilized in lifting. Where the ram units are independently operable, independently operable control means are provided on the tractor therefor. By simultaneous manipulation of the dual control means the farmer operator has been able to place both of his cylinders in operation simultaneously for lifting the heavy implement. Where lighter implements have been utilized a single cylinder has been often sufficient and it has been possible to utilize the other cylinder or ram unit for other purposes such as depth control. However, in the manipulation of the controls in lifting a heavy implement it has been found that quite frequently the farmer operator will inadvertently move only one of the control levers for the two ram units so that only one of them goes into operation. The result is that the entire weight of the implement in lifting or lowering is placed upon that cylinder and damage to the power lift system results. It is therefore the principal object of the present invention to avoid these difficulties and to provide means for assuring that in the operation of a pair of ram units in the manner hereinbefore set out it will be impossible to impose all of the weight of the implement upon a single cylinder.

Another object of the invention is to provide a power transmitting connection between a pair of ram units and an implement to be lifted thereby, wherein means are provided where the ram units are independently operable for imposing upon any one cylinder only a portion of the entire weight of the implement.

Another object of the invention is to provide in a power lift mechanism for a tractor-mounted implement wherein a pair of rock arms are independently operated by the power lift ram units and a lift arm is connected to the implement for raising and lowering the latter, means for transmitting power from the rock arms to the lift arm comprising a lever having its central portion connected by a rod to the lift arm and having its ends connected by rods or links to the rock arms. In this manner when the rock arms are actuated separately the ends of the lever successively become the fulcrums thereof in lifting the implement.

Other objects and advantages of the invention will become clear from the following detailed description when read in conjunction with the accompanying drawings, wherein.

Figure 1:
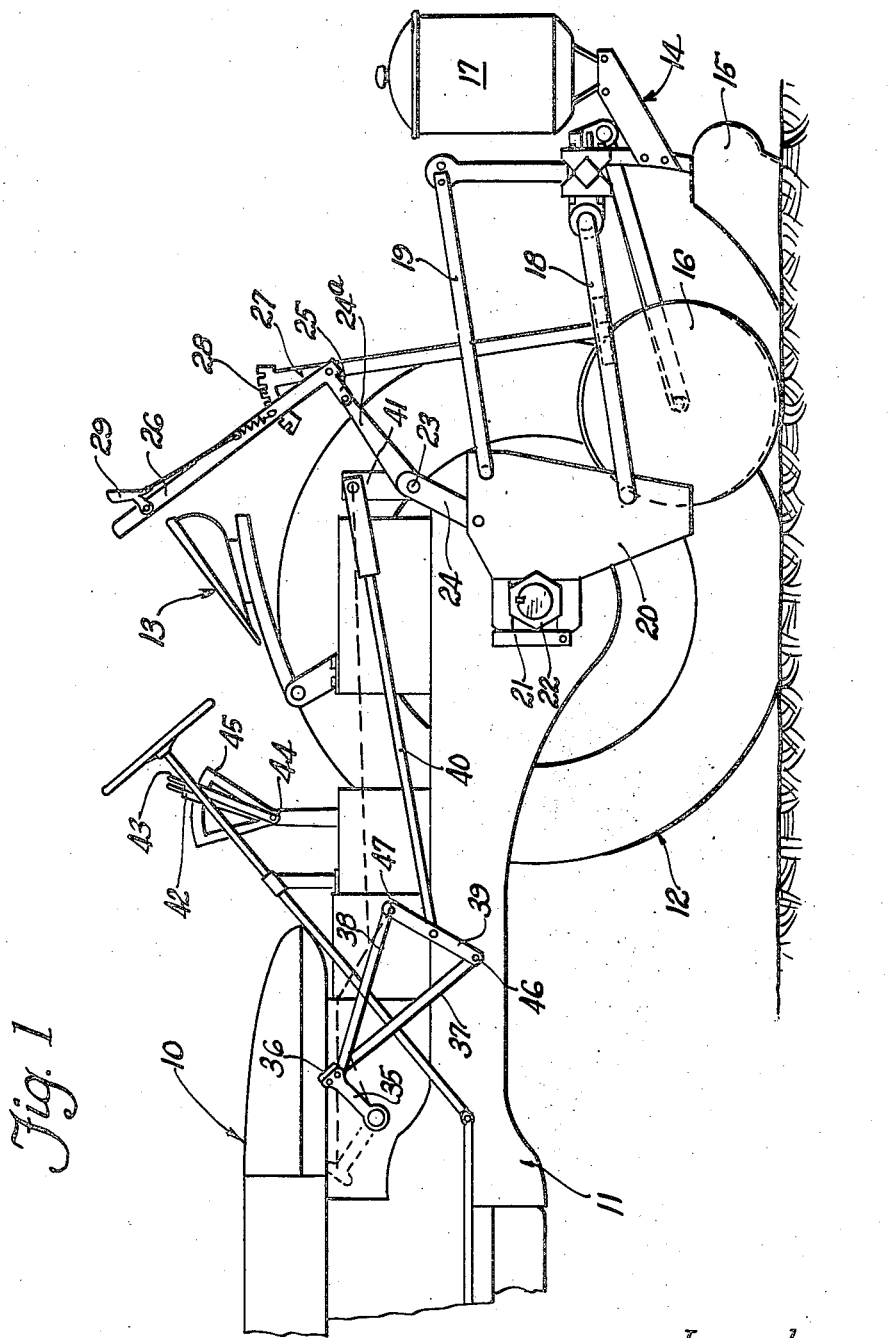
Fig. 1 is a view in side elevation of a tractor having an implement mounted thereupon and having lifting mechanism incorporating the features of the present invention, the implement being shown as resting upon the surface of the ground.

Referring to the drawings, the tractor whereon the implement with which the present invention is concerned is mounted is designated by the numeral 10 and is provided with a power plant 11, rear drive wheels 12, and an operator's station 13.

Figure 3:
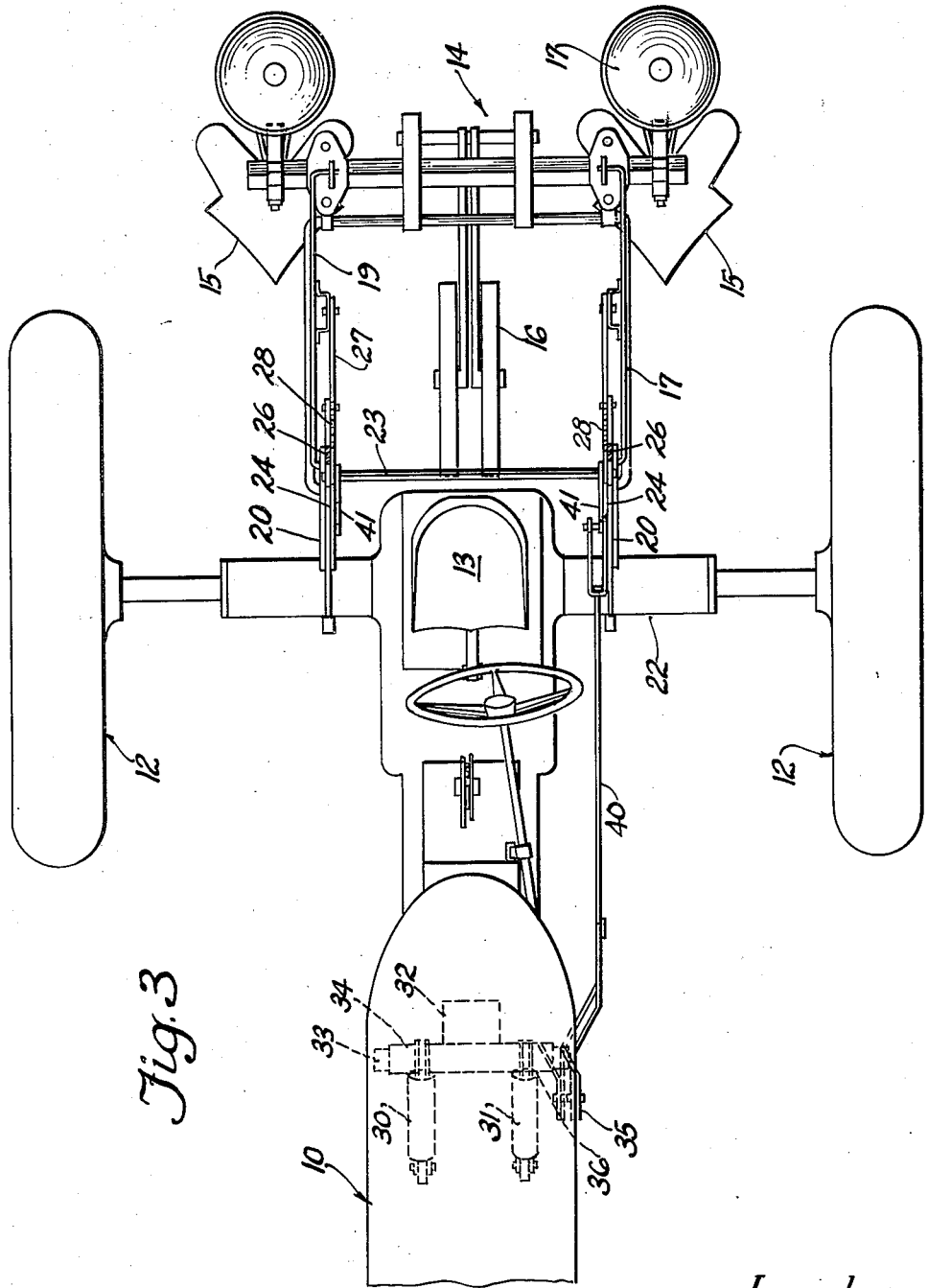
Fig. 3 is a plan view of the structure shown in Fig. 2.

The implement, which is used for purposes of illustration, is a lister planter designated 14 and comprising an earth working tool 15, a ground engaging wheel 16, and a dispensing can 17. The implement is a two-row lister as indicated in Fig. 3 and is connected to the tractor for vertical movement with respect thereto between operating and transport positions by linkage comprising a bail 18 and laterally spaced parallel links 19 vertically spaced from the bail. The bail 18 and the links 19 thus function as vertically spaced parallel linkage by which the implement may be raised and lowered in a generally straight line. Bail 18 and links 19 are pivotally connected at vertically spaced points to a plate 20 secured to a bracket 21 mounted upon the hexagonally shaped rear axle housing 22 of the tractor.

The lister 14 is raised and lowered with respect to the tractor by power lift mechanism including a transversely extending rockable member in the form of a shaft 23 mounted at the ends of laterally spaced uprights 24 secured to the plates 20 at opposite sides of the tractor body. Secured to the shaft 23 at each end thereof is an arm 24a to the outer end of which is pivotally connected a lug 25 projecting outwardly from and forming a part of the lower end of a hand lever 26 pivoted upon a support 27 and adapted to move over a quadrant 28 notched for cooperation with a conventional detent mechanism indicated at 29. Support 27 is connected at its lower end to one arm of the bail 18 and it will be noted in Fig. 3 that separate levers 26 and quadrants 28 are provided at opposite sides of the tractor body for connection to the bail 18. Support 27, quadrant 28 and lever 26 constitute the lifting connections between the arms 24a and the implement, and function to make adjustments in the position of the implement independently of the power lifting mechanism.

Figure 2:
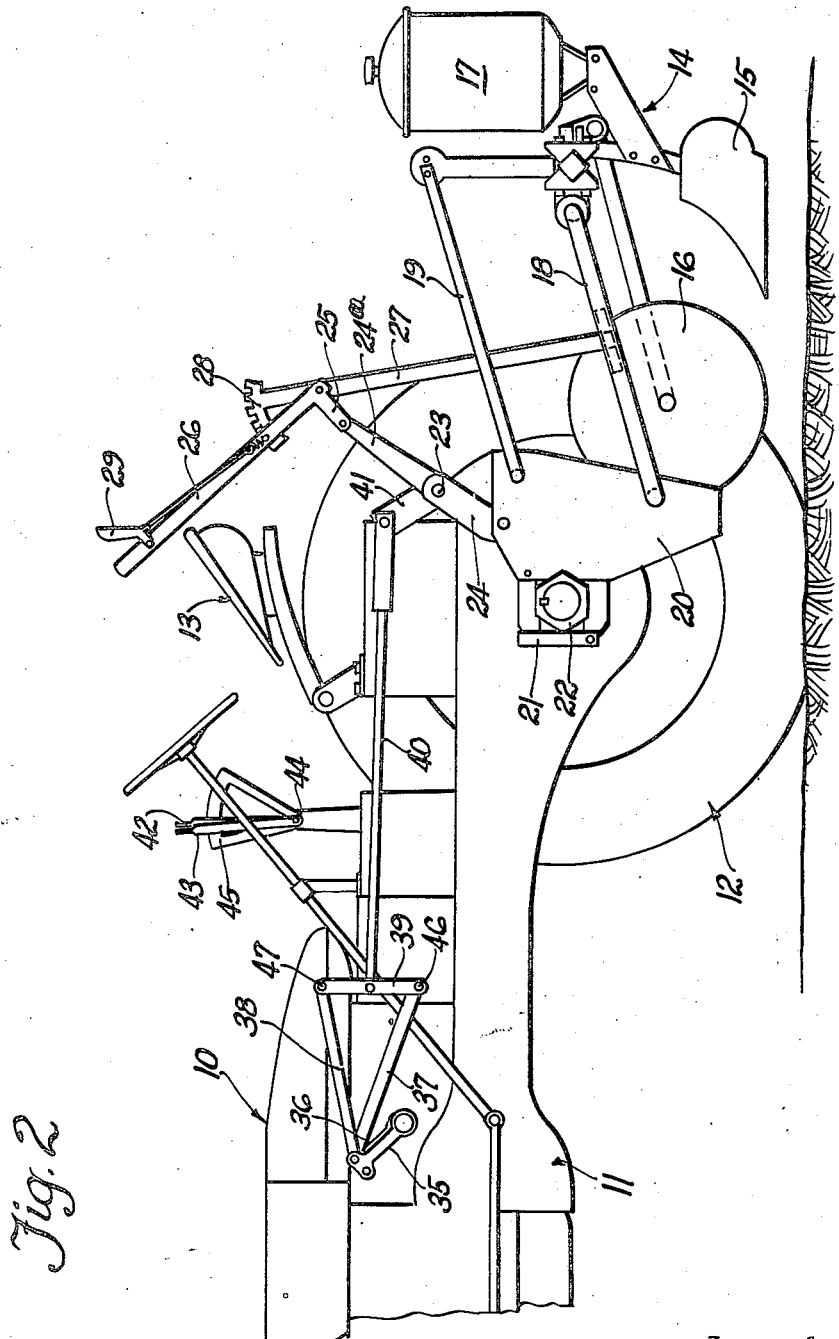
Fig. 2 is a view similar to Fig. 1 showing the implement in raised position.

It should now be clear that upon rocking of the shaft 23 in an anti-clockwise direction as viewed in Fig. 1, the implement will be raised from the position indicated in Fig. 1 to that shown in Fig. 2 and that upon reversal of the direction of rocking of the shaft the implement will be lowered to its operating position.

The mechanism by which shaft 23 is rocked includes a pair of ram units 30 and 31 of the double-acting hydraulic cylinder type receiving fluid under pressure from a pump indicated at 32 and driving power from the tractor power plant.

Likewise carried in the body of the tractor and extending transversely thereof is a rock shaft 33 having rotatably mounted thereupon a sleeve 34. As noted in Fig. 3, shaft 33 has secured to one end thereof a rock arm 35 and to one end of the sleeve 34 is secured a rock arm 36. Cylinder 30 is operatively connected to the sleeve 34 to rock the latter with respect to the shaft 33 and cylinder 31 is connected to the shaft 33 to rock the latter. The construction of the shaft 33 and sleeve 34 to accommodate independent rocking thereof by the cylinders forms no part of the present invention and the details of construction thereof may be studied by referring to the United States patent to Orelind et al. No. 2,368,156, issued January 30, 1945.

Motion of the rock arms 35 and 36 is transmitted to the rockable member 23 by mechanism comprising a pair of links or rods 37 and 38 pivotally connected at one end thereof to the respective rock arms 35 and 36. Links 37 and 38 extend rearwardly of the tractor from the rock arms and their ends are pivotally connected to the ends of a generally vertically extending member in the form of a lever 39. In the lowered position of the implement shown in Fig. 1 the lever 39 thus forms the base of a triangle, the other sides of which are formed by the links 37 and 38 which converge toward their connections with the rock arms 35 and 36. Midway of its ends the lever 39 is pivotally connected to one end of a push rod 40, the other end of which is pivotally connected to a lift arm 41 secured to one end of the shaft 23. By rocking the arms 35 and 36 in a counter-clockwise direction, as viewed in Fig. 1, it will be observed that motion will be transmitted through the links 37 and 38, the lever 39, and the rod 40 to rock the lift arm 41 in the same direction to lift the implement to the position indicated in Fig. 2.

The operation of the ram units 30 and 31 is controlled by the tractor operator from his station 30 by manipulating control levers 42 and 43 pivoted at 44 for movement over a quadrant 45. These levers may be operated independently to separately rock the arms 35 and 36 or simultaneously. However, as pointed out hereinbefore, it frequently happens that an operator in attempting to simultaneously move the levers 42 and 43 will accidentally strike only one of the levers, thus actuating only one of the cylinders 30 or 31, the result being the placing of the entire burden of the implement upon one of the cylinders and possible injury thereto. With the present invention, however, it is immaterial if the operator strikes only one of the levers 42 or 43 first. For instance, he may move one of the levers to a position corresponding to the transport position of the implement which is desired. As this is done, one of the rock arms, for example rock arm 35, comes into operation and moves in a counter-clockwise direction, bringing the links 37 and 38 and the lever 39 into the dotted line position indicated in Fig. 1, in which position it will be observed that substantially no lifting of the implement will take place. In this position with the rock arm 35 moved to its farthest advanced position the lower pivot point 46 connecting the link 37 to the link 39 becomes the fulcrum of a lever of the second class, and only a part of the weight of the implement is assumed by the ram unit 31, in this case one-half the weight of the implement. The operator may then move control lever 43 to actuate cylinder 30 and rock arm 36, the fulcrum of the lever then becomes the pivot point 47 so that the other half of the weight of the implement is assumed by the cylinder 30.

From the foregoing description it will be observed that a tractor operator mounted upon a tractor having independently operable ram units which are also simultaneously operable and connected to an implement for lifting thereof cannot under any circumstances place the entire burden of the weight of the implement upon one of those cylinders by accidentally or inadvertently striking only one of the control members for these units. It should also be understood that this invention has been described in its preferred embodiment and that modifications may be made therein without departing from the spirit of the invention or the scope of the appended claims.

What is claimed is:

1. For use upon a tractor having a longitudinally extending body and an implement mounted thereon, a pair of independently operated hydraulic cylinders deriving power from the tractor power plant, a pair of closely adjacent rock arms independently mounted on the tractor on a common axis at one side of the tractor body for rocking movement longitudinally thereof, connecting means between the cylinders and the respective rock arms for rocking the latter, a pair of control members movable independently or simultaneously for actuating the cylinders to rock said arms, a member on the tractor rockable about a transverse axis longitudinally spaced from said rock arms and connected to the implement for moving the latter between operating and transport positions upon rocking of the rockable member, a longitudinally extending lift rod at the side of the tractor between said rock arms and said rockable member and pivotally secured at one end to the latter, and triangularly arranged members connecting the other end of the rod to said arms comprising a vertically extending lever pivotally connected medially of its ends on a transverse axis to the other end of said rod, and a pair of converging links pivotally connecting the ends of said lever to the respective of said rock arms, said links and said lever forming a triangle when said rock arms are in alignment at the beginning and end of the lifting operation, the independent rocking of one said arm and movement of its associated link through part of its range of movement causing swinging of the lever about its pivot on the rod before substantial lifting movement is imparted to the rod, whereby rocking of one arm is insufficient to raise the implement to its transport position.

2. For use upon a tractor having a longitudinally extending body and an implement mounted thereon, a pair of closely adjacent rock arms independently mounted on the tractor on a common axis at one side of the tractor body for rocking movement longitudinally thereof, a member on the tractor rockable about a transverse axis longitudinally spaced from said rock arms and connected to the implement for moving the latter between operating and transport positions upon rocking of the rockable member, connecting linkage from the rock arms to the rockable member including a lift rod connected at one end to the rockable member, a vertically extending lever pivoted medially of its ends to the other end of the lift rod, and a pair of converging links pivotally connected at one end to the respective rock arms and at the other end to the ends of said lever, said links and said lever forming a triangle when said rock arms are in alignment at the beginning and end of the lifting operation, said lever being swingable about its pivot on the rod upon independent movement of one rock arm, whereby rocking of one arm is insufficient to raise the implement to its transport position.

JAMES MORKOSKI.

REFERENCES CITED

The following references are of record in the file of this patent:

UNITED STATES PATENTS

| Number | Name | Date |
| --- | --- | --- |
| 2,324,868 | Mott | July 20, 1943 |
| 2,341,147 | Kriegbaum | Feb. 8, 1944 |
| 2,351,511 | Hipple et al. | June 13, 1944 |